(12) United States Patent
Xu et al.

(10) Patent No.: US 10,659,305 B2
(45) Date of Patent: May 19, 2020

(54) METHOD AND SERVER SYSTEM FOR IDENTIFYING DEVICES

(71) Applicant: Lenovo (Beijing) Co., Ltd., Beijing (CN)

(72) Inventors: Youyue Xu, Beijing (CN); Caihong Zhang, Beijing (CN); James Yeh, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 230 days.

(21) Appl. No.: 15/938,668

(22) Filed: Mar. 28, 2018

(65) Prior Publication Data

US 2018/0287882 A1    Oct. 4, 2018

(30) Foreign Application Priority Data

Mar. 28, 2017   (CN) ........................... 2017 1 0194737

(51) Int. Cl.
| | |
|---|---|
| *H04L 12/24* | (2006.01) |
| *H04L 12/26* | (2006.01) |
| *G06F 13/42* | (2006.01) |

(52) U.S. Cl.
CPC ............ *H04L 41/12* (2013.01); *H04L 41/046* (2013.01); *H04L 41/0856* (2013.01); *H04L 43/0811* (2013.01); *G06F 13/4221* (2013.01); *G06F 2213/0026* (2013.01)

(58) Field of Classification Search
CPC ................ G06F 13/4022; G06F 1/189; G06F 2213/0026; G06F 11/3003; G06F 11/3031; G06F 11/3055; G06F 13/16; G06F 13/36; H04L 41/12; H04L 12/40032; H04L 43/0811; H04L 12/24; H04L 12/26; H05K 7/1492; G01R 31/40
See application file for complete search history.

(56) References Cited

U.S. PATENT DOCUMENTS

| | | | | |
|---|---|---|---|---|
| 2006/0280195 | A1* | 12/2006 | Lopez, Jr. ............... | H04L 41/24 370/419 |
| 2015/0256394 | A1* | 9/2015 | Palmer ..................... | H04L 12/10 709/221 |
| 2016/0072761 | A1* | 3/2016 | Shih ..................... | H04L 61/2015 709/220 |
| 2017/0117813 | A1* | 4/2017 | Lee ......................... | G01R 31/40 |
| 2017/0156238 | A1* | 6/2017 | Li ........................... | G05B 15/02 |
| 2017/0308447 | A1* | 10/2017 | Wu ....................... | G06F 11/2094 |
| 2019/0357334 | A1* | 11/2019 | Hsia ....................... | H02J 7/0068 |

FOREIGN PATENT DOCUMENTS

| | | | |
|---|---|---|---|
| CN | 101202649 | A | 6/2008 |
| CN | 102045240 | A | 5/2011 |
| CN | 103166862 | A | 6/2013 |
| CN | 104579991 | A | 4/2015 |
| CN | 105808460 | A | 7/2016 |
| CN | 103945285 | A | 11/2017 |

\* cited by examiner

*Primary Examiner* — Sargon N Nano
(74) *Attorney, Agent, or Firm* — Anova Law Group, PLLC

(57) ABSTRACT

A method and a server system for identifying a device connected to a server system are provided. The method comprises: establishing a connection between the server system and a plurality of target devices; and acquiring device information of each of the plurality of target devices based on the connection. The connection is one of a data connection and a device connection.

8 Claims, 9 Drawing Sheets

METHOD AND SERVER SYSTEM FOR IDENTIFYING DEVICES

CROSS-REFERENCES TO RELATED APPLICATIONS

This application claims priority of Chinese Patent Application No. 201710194737.5, filed on Mar. 28, 2017, the entire contents of which are hereby incorporated by reference.

TECHNICAL FIELD

The present disclosure generally relates to the technical field of computer network and, more particularly, to a method and a server system for identifying devices connected to the server system.

BACKGROUND

In an internet system including a bus and a peripheral component interconnect express (hereinafter referred to as PCI-Express or PCIe) interface, host nodes are connected to a server system via the PCIe switch port.

Problems arise, however, because the server system cannot identify the devices connected therewith.

BRIEF SUMMARY OF THE DISCLOSURE

One aspect of the present disclosure provides a method for identifying a device connected to a server system. The method comprises: establishing a connection between the server system and a plurality of target devices; and acquiring device information of each of the plurality of target devices based on the connection. The connection is one of a data connection and a device connection.

Another aspect of the present disclosure provides a server system. The server system comprises: a processor connected to a connector. The connector establishes a connection between the server system and a plurality of target devices. The processor acquires device information of the plurality of target devices through the connection established by the connector. The connection established by the connector includes one of a data connection and a device connection.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Various aspects and features of the present disclosure will be described hereinafter with reference to the accompanying drawings. It should be understood that, various modifications may be made to the disclosed embodiments. Thus, the specification shall not be construed as limiting, but is merely intended to illustrate examples of the embodiments. Other modifications obtainable by those skilled in the relevant art shall all fall within the scope and spirit of the present disclosure.

Figure 2A:
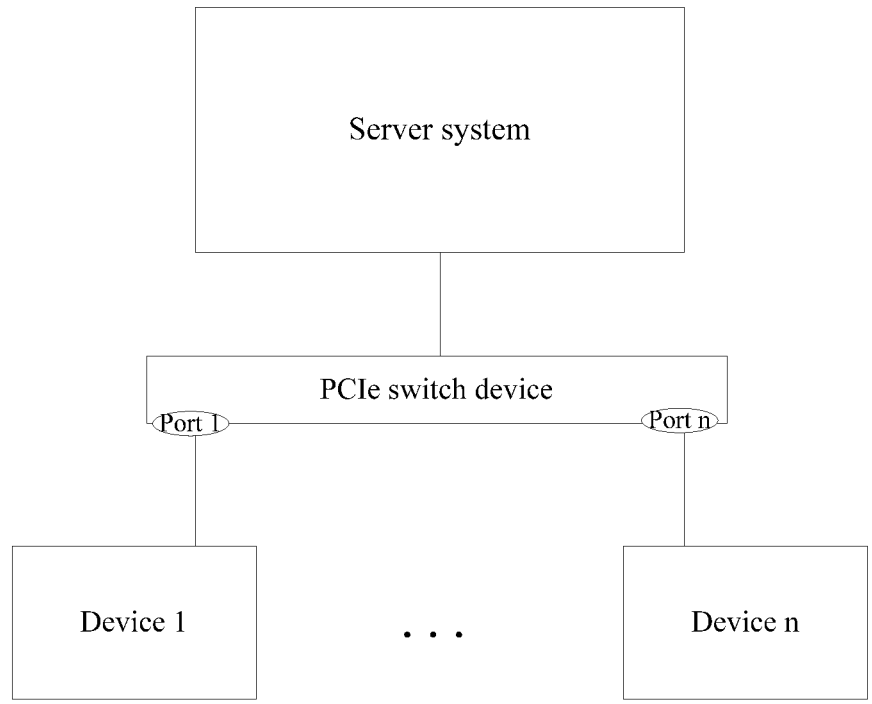
FIG. 2A illustrates a schematic view of an application example of a connection structure between a server system and target devices in accordance with some embodiments of the present disclosure.

According to the present disclosure, a plurality of target devices may be connected to a server system, for example, via a PCIe switch device including a plurality of PCIe switch ports. FIG. 2A illustrates a schematic view of a connection structure between a server system and a plurality of devices, where the connection structure is established through a PCIe switch device. As shown in FIG. 2A, the PCIe switch device may include a plurality of ports (port 1, port 2 . . . , port n), a device 1 may be connected to the server system via the port 1, a device 2 may be connected to the server system via a port 2, . . . , and a device n may be connected to the server system via the port n, where n is a positive integer greater than or equal to 2.

Figure 1A:
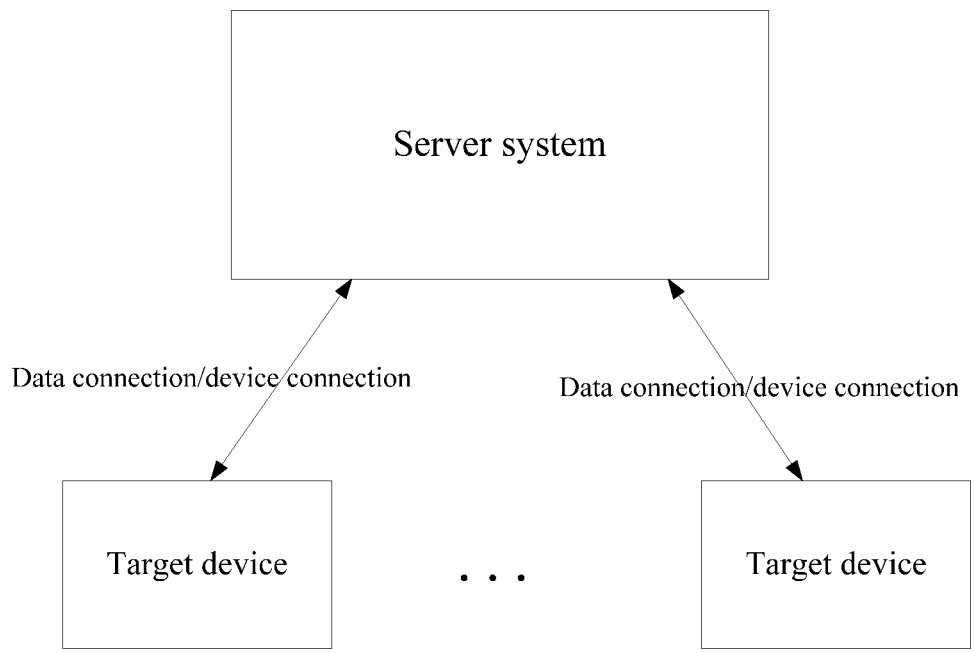
FIG. 1A illustrates a structural schematic view of an example of a connection between a server system and target devices in accordance with some embodiments of the present disclosure.
Figure 1B:
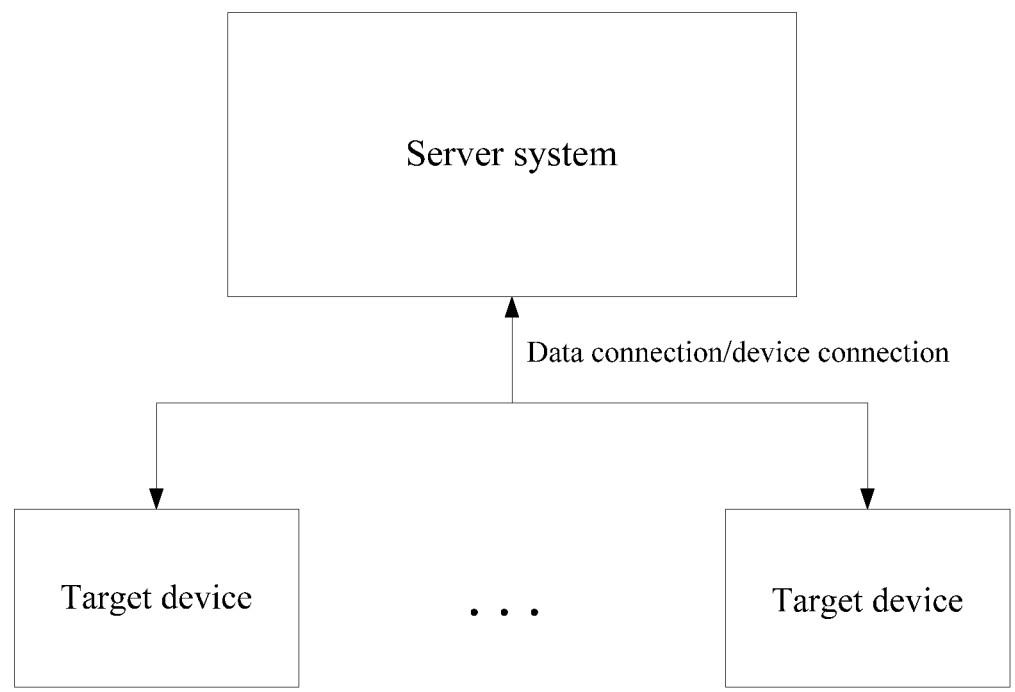
FIG. 1B illustrates a structural schematic view of another example of a connection between a server system and target device in accordance with some embodiments of the present disclosures.

The present disclosure provides a method for identifying the plurality of target devices connected to the server system. The method for identifying target devices may be implemented by establishing a connection such as a data connection or device connection between the target devices and the server system. FIG. 1A illustrates a structural schematic view of an example of a connection between a server system and target devices in accordance with some embodiments of the present disclosure. FIG. 1B illustrates a structural schematic view of another example of a connection between a server system and target devices in accordance with some embodiments of the present disclosure.

As shown in FIG. 1A and FIG. 1B, a plurality of target devices may establish and share a data connection or a device connection with a server system, or, the plurality of target devices may each establish a data connection or device connection with the server system, respectively. That is, referring to FIG. 1A, each of a plurality of target devices may be connected to a server system via a data connection or a device connection. Referring to FIG. 1B, the plurality of target devices may share a connection, i.e., a data connection or device connection, for being connected to the server system.

The server system may, for example, include one or more processors. The target devices may be, for example, one or more nodes in a computing sub-system device, a storage sub-system device, a cooling sub-system device, and a power-supplying sub-system device, etc.

Further, the server system may acquire device information of the target devices via the data connection or device connection between the server system and such target devices. The device information of a target device may include one or more types of characteristic/identity information of the target device, such as identification (ID) information, resource information, and port information of the device connection, etc.

In one embodiment, the data connection between the server system and a target device may be software-based data connection, such as a driving channel connection, and the server system may acquire the device information of the target device via the driving channel connection.

In another embodiment, the device connection between the server system and a target device may be specifically implemented by configuring an additional device between the server system and the target device, and the server system may acquire the device information of the target device via the additional device.

Figure 13:
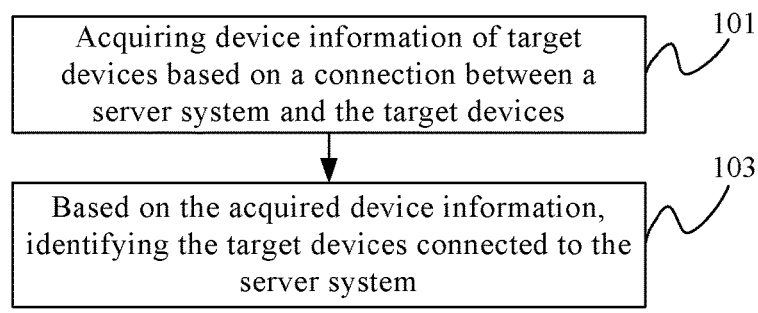
FIG. 13 illustrates an example of a method for identifying devices in a server system in accordance with some embodiments of the present disclosure.

As such, the present disclosure provides a method for identifying devices in a server system. FIG. 13 illustrates an example of a method for identifying devices in a server system in accordance with some embodiments of the present disclosure. As shown in FIG. 13, by data connection or device connection between the server system and target devices, device information of the target devices may be acquired (S101). Further, based on the acquired device information of the target devices, the server system may identify the target devices connected to the server system, thereby realizing the objective of the present disclosure (S103).

Figure 2B:
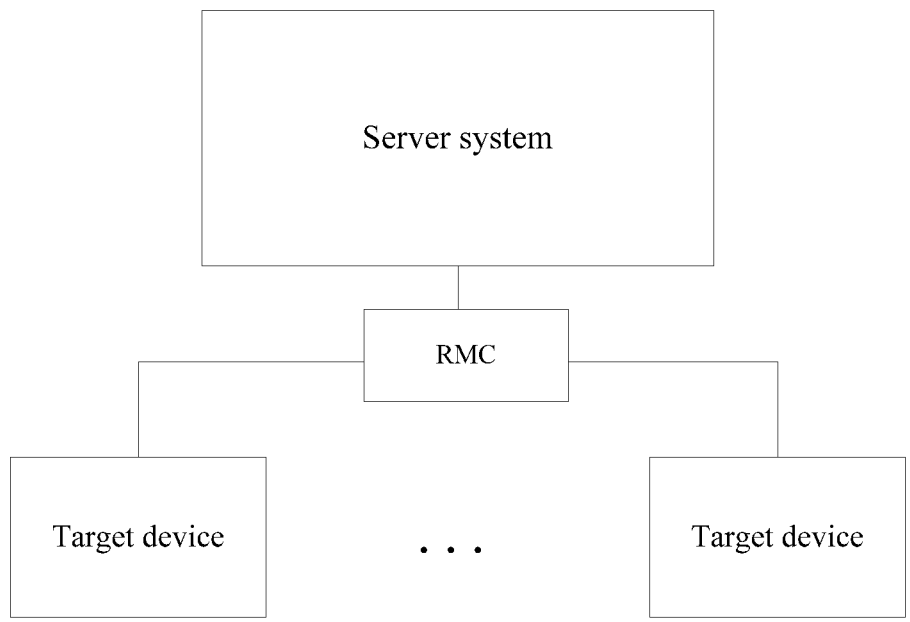
FIG. 2B illustrates a schematic view of another application example of a connection structure between a server system and target devices in accordance with some embodiments of the present disclosure.
Figure 3:
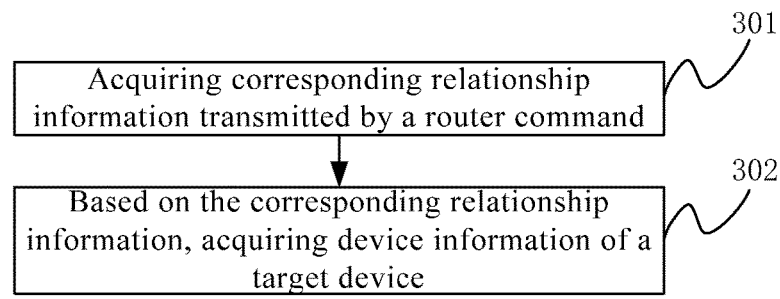
FIG. 3 illustrates an example of a flow chart showing a method for acquiring device information of target devices in accordance with some embodiments of the present disclosure.

More specifically, in one example, FIG. 2B illustrates a schematic view of a device connection between a server system and target devices, and FIG. 3 illustrates a flow chart of a corresponding method for identifying such target devices in the server system. As shown in FIG. 2B, a router manager center (RMC) may be connected between a server system and a plurality of target devices. That is, the device connection between the server system and a plurality of target devices may refer to a RMC connection realized by connecting a RMC between the server system and the plurality of target devices.

Further, device information of the plurality of target devices may be acquired based on the device connection, e.g., the RMC connection. For example, as shown in FIG. 3, a method for acquiring the device information of the target devices based on the device connection may specifically include: acquiring correspondence relationship information transmitted by the RMC (S301).

More specifically, the correspondence relationship information may be information obtained by the RMC by powering up ports of the target devices connected to the server system in a certain order. The correspondence relationship information may include: correspondence relationship information between ports, device identities of target devices, and IP addresses of the target devices.

The method for acquiring the device information of the target devices based on the device connection may further include: based on the correspondence relationship information, acquiring device information of the target devices (S302).

More specifically, the RMC may be utilized to, each time, drive a port to work by powering up the port. Further, for each powered up port, the RMC may acquire a power-up signal corresponding to the powered-up port, and based on the power-up signal, the RMC may further acquire the correspondence relationship information between port information of the powered-up port, a device identity of a target device to which the powered-up port is connected, and an IP address of the target device.

After each port is powered up respectively, the RMC may acquire the correspondence relationship information of each port. Further, the server system may acquire the correspondence relationship information transmitted by the RMC, and based on such correspondence relationship information, acquire the device information of the target devices, such as the device identities, etc. Further, based on the acquired device information, the target devices connected to the server system may be identified by the server system.

Figure 4:
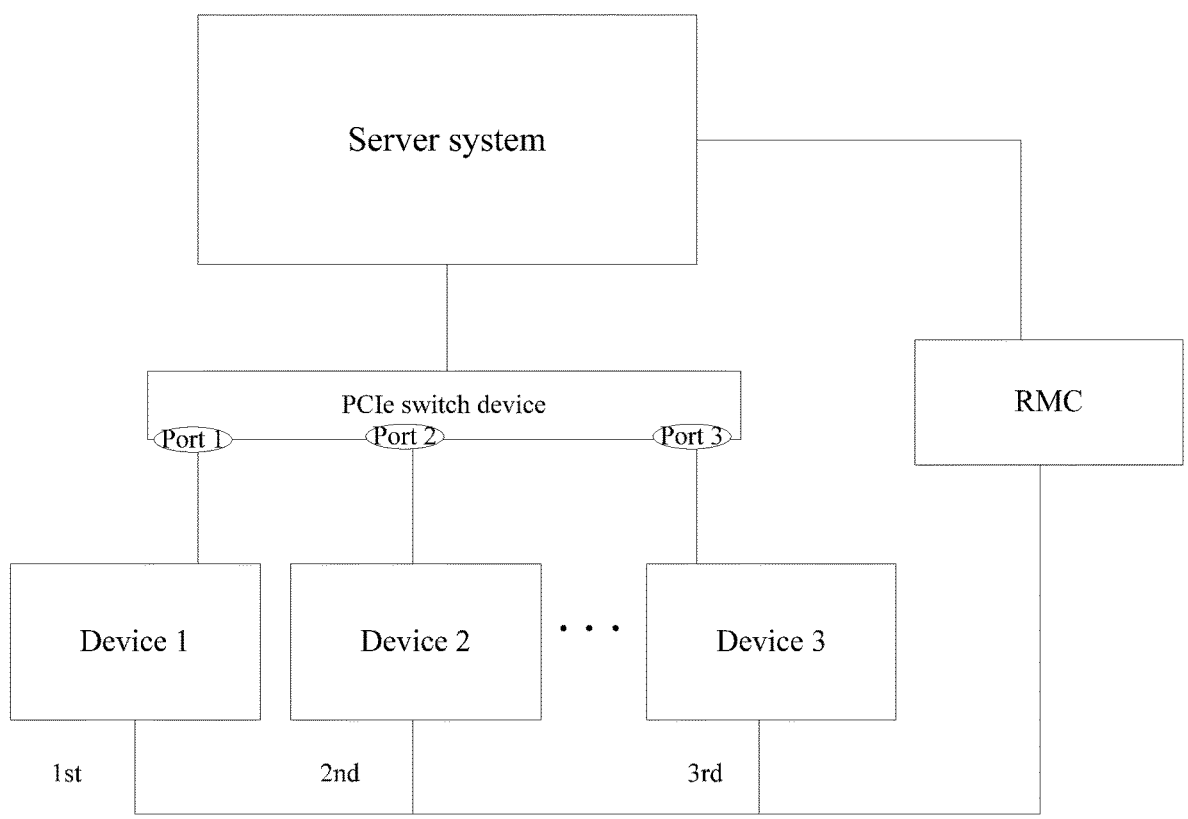
FIG. 4 illustrates a schematic view of another application example of a connection structure between a server system and target devices in accordance with some embodiments of the present disclosure.

FIG. 4 illustrates a schematic view of another application example of a connection structure between a server system and target devices. As shown in FIG. 4, the server system may be connected to three or more target devices. For example, a device 1 may be connected to the server system via a port 1 of a PCIe switch device, a device 2 may be connected to the server system via a port 2 of the PCIe switch device, and a device 3 may be connected to the server system via a port 3 of the PCIe switch device.

Further, a RMC may be connected to the server system and respectively connected to the three target devices. The RMC may be provided for powering up each port (i.e., the port 1, the port 2, and the port 3) in a certain order, and based on each power-up signal, acquiring device information of each target device (i.e., the device 1, the device 2, and the device 3).

For example, the RMC may first power up the port 1 to acquire a power-up signal 1 corresponding to the port 1, then power up the port 2 to acquire a power-up signal 2 corresponding to the port 2, and then power up the port 3 to acquire a power-up signal 3 corresponding to the port 3. Further, based on such power-up signals (the power-up signal 1, the power-up signal 2, and the power-up signal 3), the device information of the device 1, device 2, and device 3 may be respectively acquired.

Figure 5A:
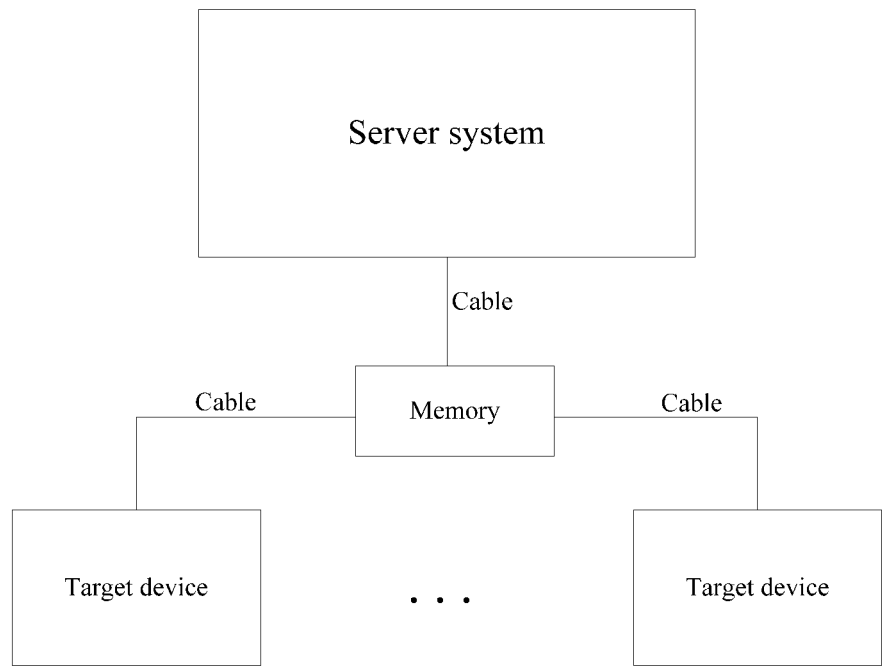
FIG. 5A illustrates a schematic view of another application example of a connection structure between a server system and target devices in accordance with some embodiments of the present disclosure.
Figure 5B:
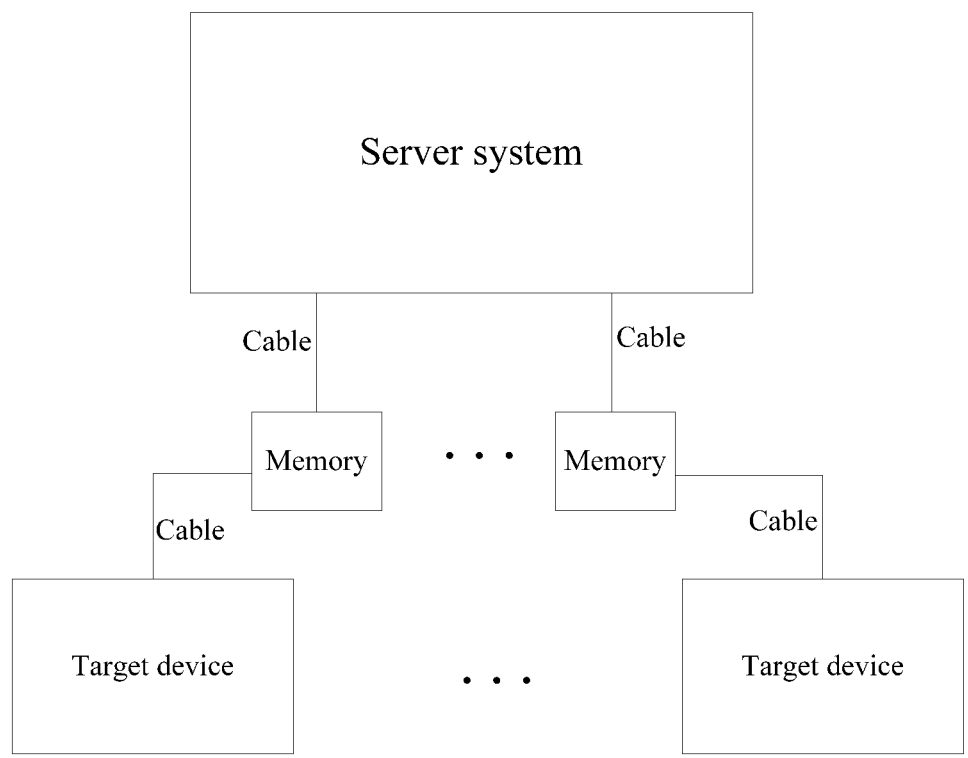
FIG. 5B illustrates a schematic view of another application example of a connection structure between a server system and target devices in accordance with some embodiments of the present disclosure.

In one embodiment, the device connection between the server system and the target devices may be a memory connection realized by connecting a memory between the server system and the target device(s). For example, FIG. 5A illustrates an example of a memory connection between a server system and target devices, and FIG. 5B illustrates another example of a memory connection between the server system and the target devices. As shown in FIG. 5A, a memory is configured between a server system and a plurality of target devices, and the memory may be connected to the server system and further connected to the plurality of target devices, respectively. The connection between the memory and the server system and the connection between the memory and each of the plurality of target devices may be implemented, for example, via a cable.

Alternatively, as shown in FIG. 5B, a plurality of memories may be configured between a server system and a plurality of target devices, and each memory may be connected to a target device and the server system. The connection between a memory and the server system may be implemented by a cable, and the connection between a memory and a corresponding target device may also be implemented by a cable.

That is, referring to FIG. 5A and FIG. 5B, one or more memories may be connected between the server system and a plurality of target devices respectively via a cable. Further, it should be noted that, the memory connection herein is different from a connection in which the plurality of target devices are connected to the server system respectively via a PCIe switch port.

Further, because the one or more memories are connected between the server system and the target devices, each target device may upload corresponding device information to the memory via a cable connected between the memory and the target device, and the server system may thus read the corresponding device information of each target device that is pre-stored in the one or more memories from the one or more memories.

It should be noted that, the server system may also store self-related information in the one or more memories, and the plurality of target devices may thus acquire information related to the server system from the one or more memories.

Figure 6:
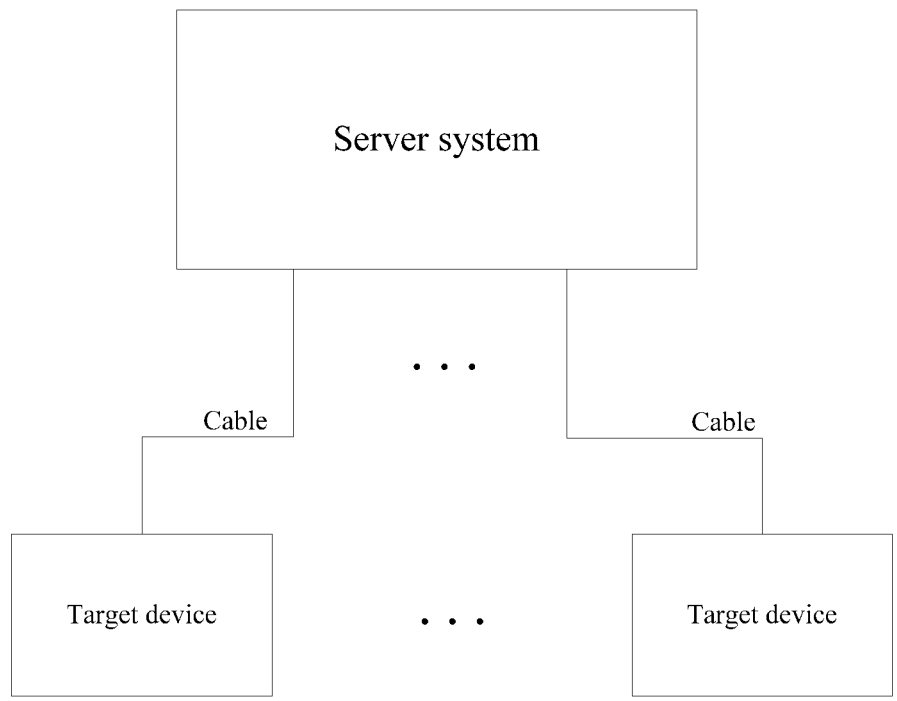
FIG. 6 illustrates a schematic view of another application example of a connection structure between a server system and target devices in accordance with some embodiments of the present disclosure.

In one embodiment, the device connection between the server system and target devices may be a cable connection implemented by connecting one or more cables between the server system and the target devices. For example, FIG. 6 illustrates an example of a cable connection between a server system and a plurality of target devices. As shown in FIG. 6, a cable may be connected between the server system and each of the plurality of target devices. Such cable connection is also different from a connection between a server system and a plurality of target devices in which the plurality of target devices are connected to the server system respectively via a PCIe switch port.

Figure 7:
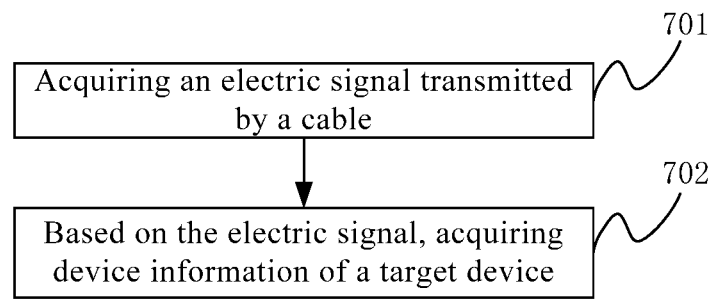
FIG. 7 illustrates another example of a flow chart showing a method for acquiring device information of target devices in accordance with some embodiments of the present disclosure.

Based on the aforementioned descriptions, the present disclosure provides another method for acquiring device information of the target devices. For example, FIG. 7 illustrates another flow chart showing a method for acquiring device information of the target devices in a server system. As shown in FIG. 7, acquiring the device information of the target devices may specifically include:

S701: acquiring an electric signal transmitted by each cable; and

S702: based on the electric signal, acquiring the device information of the target devices.

More specifically, the electric signals transmitted from different target devices respectively via a cable may be different. Thus, the cables connected between the server system and the target devices may be utilized to respectively transmit an electric signal presenting device information of a corresponding target device, such that the device information of the target devices may be acquired by the server system. Further, based on the acquired device information, the target devices may be identified.

In one embodiment, data connection between the server system and a plurality of target devices may be a driving channel connection between the server system and the target device. The driving channel connection may be realized based on a connection between the target devices and the server system via PCIe switch ports. A target device may actively upload its device information based on the driving channel. Accordingly, the server system may utilize the driving channel between the server system and the target device to receive the device information uploaded by the target device.

Figure 8:
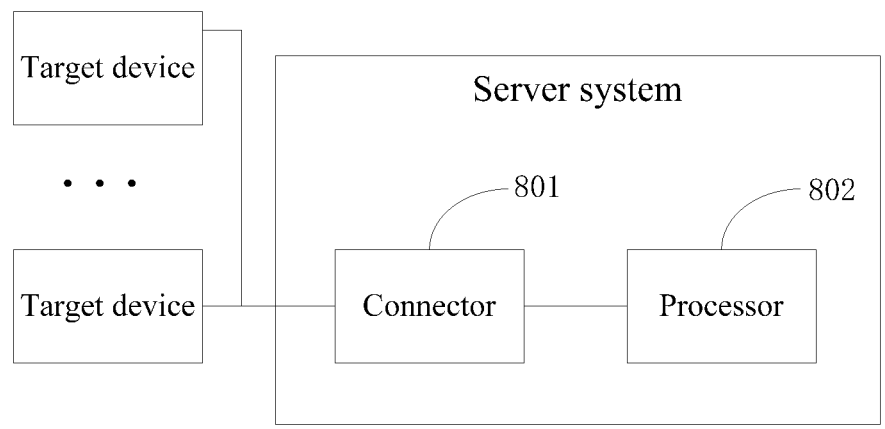
FIG. 8 illustrate a structural schematic view of an example of a server system in accordance with some embodiments of the present disclosure.

The present disclosure further provides a server system. For example, FIG. 8 illustrate a structural schematic view of an example of a server system. Referring to FIG. 8, the server system may include a connector 801, and a processor 802. The connector 801 may be provided for implementing a data connection or a device connection between the server system and one or more target devices. The server system and a target device may be connected via a PCIe switch port, as illustrated in FIG. 2A. However, the connection realized by the connector 801 between the server system and the one or more target devices is different from the connection realized by the PCIe switch port.

The processor 802 may be provided for acquiring the device information of the target devices) via the data connection or device connection. That is, data connection or device connection may exist between the server system and a target device, and device information of the target device may be acquired by the processor 802 through such data connection or device connection.

It should be noted that, the processor 802 may be realized by a pooled system management element (PSME) in the server system, and the PSME may be a software server including a standard interface configured for managing and monitoring resources of physical pool and logic pool in the server system.

Based on the aforementioned descriptions, the disclosed server system acquires the device information of the target devices through the data connection or device connection established between the server system and the target devices. Further, based on the acquired device information, the server system may identify the target devices connected to the server system, thereby realizing objectives of the present disclosure.

Further, while the connector 801 can be physically configured within the server system, in some situations, the connector 801 can be configured outside of the server system. In one embodiment, the connector 801 may be a RMC, and the RMC may be connected between the server system and one or more target devices. Under such condition, the processor 802 may be specifically configured for: acquiring correspondence relationship information transmitted by the RMC, where the correspondence relationship information may be information obtained by the RMC by powering up ports of the target devices connected to the server system in a certain order. The correspondence relationship information may include: correspondence relationship information between ports, device identities of the target devices, and IP addresses of the target devices. Based on such correspondence relationship information, the device information of the target devices may be acquired by the server system.

Figure 9:
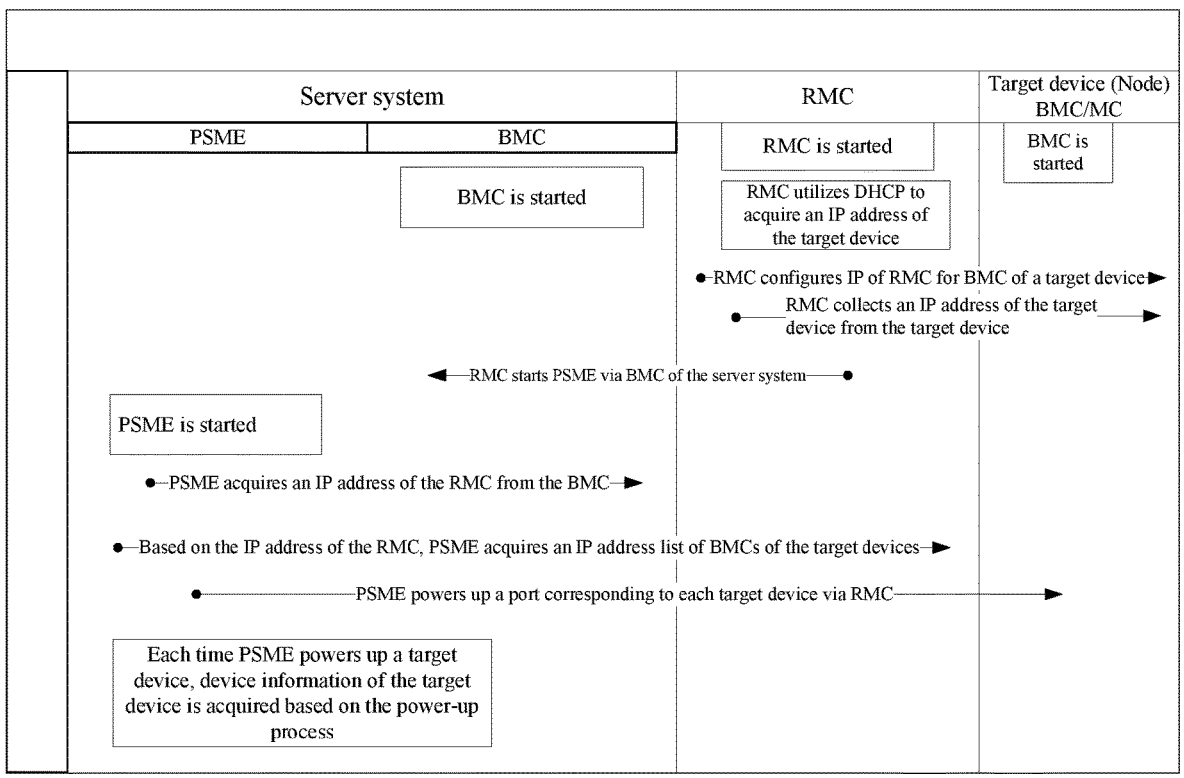
FIG. 9 illustrates a structural schematic view of an application example of a server system in accordance with some embodiments of the present disclosure.

FIG. 9 illustrates an example of an interaction diagram of a server system. As shown in FIG. 9, the server system may include: a PSME, and a baseboard management controller (BMC). The server system may be connected to a router manager center (RMC), and the RMC may be further connected to a BMC or a management controller (MC) of each target device.

More specifically, referring to FIG. 9, the BMC of the server system, the RMC, and the BMC of the target device may be started. After the RMC is started, a dynamic host configuration protocol (DHCP) server may be utilized to acquire an IP address of each target device. For example, after configuring an IP of the RMC for the BMC of each target device, the RMC may collect the IP address of each target device from the target devices.

Further, the RMC may start the processor of the server system, such as the PSME, via the BMC of the server system. The PSME of the server system may acquire the IP address of the RMC from the BMC of the server system, and based on the IP address of the RMC, acquire an IP address list of the BMCs of the target devices from the RMC, where the IP address list comprises IP addresses of all target devices.

Further, PSME may each time power up a port of one target device via the RMC and drive the corresponding port to work, such that the RMC may acquire correspondence relationship information between each port, an IP address corresponding to each port, and device identity of each target device corresponding to each IP address. Thus, the PSME may acquire the device information of each target device.

In one embodiment, the connector 801 may be a memory, and the memory may be each connected between the server system and the target devices via a cable. Further, the device information of the target devices may be pre-stored in the memory. Under such condition, the processor 802 may be specifically provided for acquiring pre-stored device information of the target devices from the memory.

Optionally, the memory connected between the server system and the target devices may be, for example, an electrically erasable programmable read-only memory (EEPROM). Further, the number of memories connected between the server system and one or more target devices may be one or more, and the types of the one or more memories are not limited by the present disclosure. Further, the related information of the server system may also be pre-stored in the memory, and the related information of the server system pre-stored in the memory may be accessed by any of the target devices.

Figure 10:
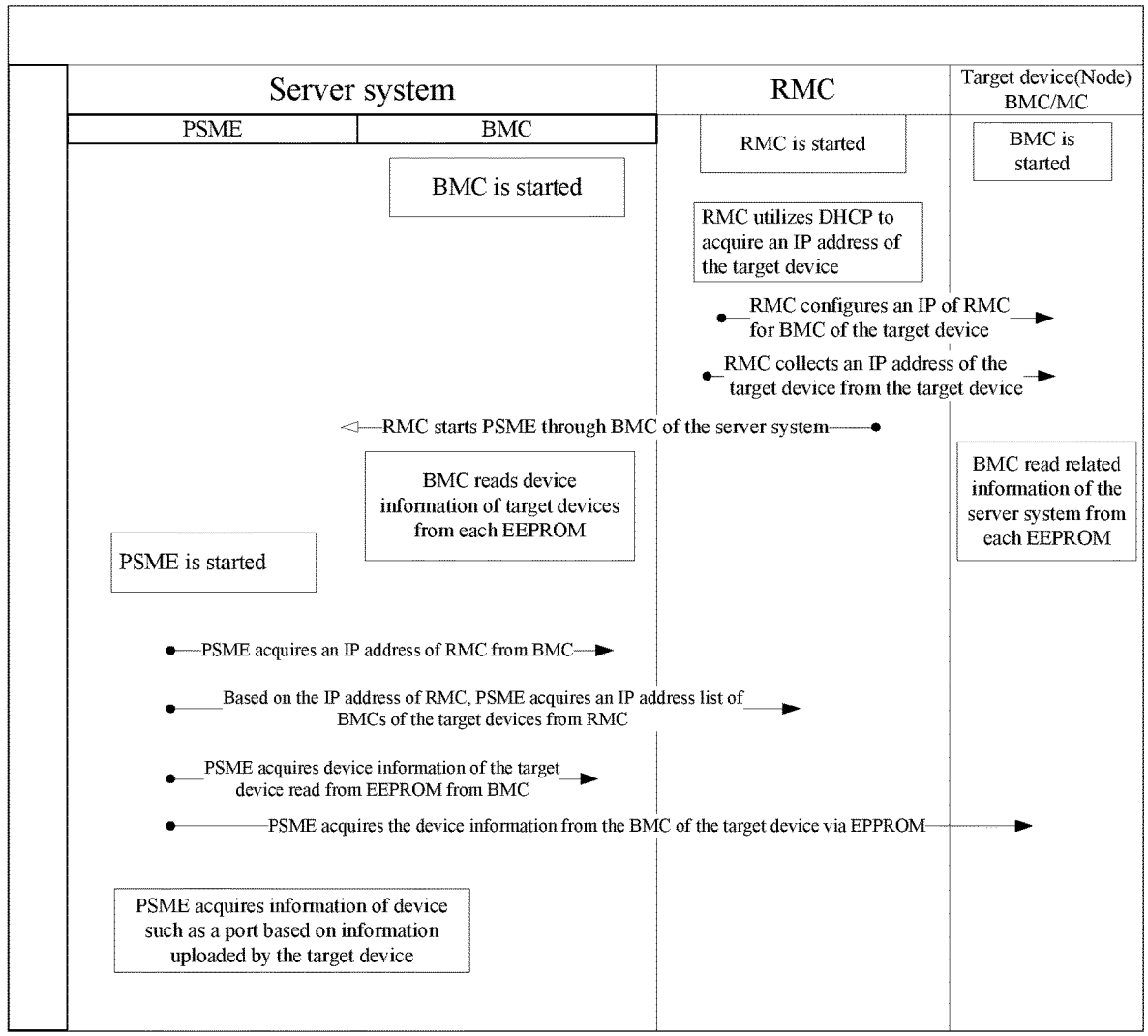
FIG. 10 illustrates a structural schematic view of another application example of a server system in accordance with some embodiments of the present disclosure.

FIG. 10 illustrates another example of an interaction diagram of a server system. As shown in FIG. 10, the server system may include: a PSME, and a BMC. The server system may be further connected to a RMC, and the RMC may be connected to a BMC or MC of each of a plurality of target devices.

More specifically, referring to FIG. 10, the BMC of the server system, the RMC, and the BMC or MC of the target device may be started. Similarly, after the RMC is started, a dynamic host configuration protocol (DHCP) server may be utilized to acquire an IP address of each target device. For example, after configuring an IP of the RMC for the BMC of each target device, the RMC may collect the IP address of each target device from the target devices. Further, the PSME of the server system may be started, for example, by the RMC via the BMC of the server system.

Further, the BMC of each target device and the BMC of the server system may each access the memory, such as an EEPROM. Because each target device may store corresponding device information in the EEPROM and the server system may store its related information in the EEPROM, the server system may be able to read the device information of each target device from the EEPROM, and the target devices may also read the related information of the server system from the EEPROM.

More specifically, after the PSME is started, the BMC of the server system may read the device information of a target device from the EEPROM, and the PSME may read the device information of the target device from the BMC of the server system. That is, the PSME of the server system may read the device information of target devices from EEPROM to which the device information (e.g., port number) of the target devices is uploaded.

Optionally, after the PSME is started, the PSME of the server system may be able to acquire the IP address of the RMC from the BMC of the server system. Based on the IP address of the RMC, the PSME of the server system may be able to acquire an IP address list of the BMCs of the target devices from the RMC, where the IP address list comprises IP addresses of all target devices.

In one embodiment, the connector 801 may be a cable, and the cable may be connected between the server system and a target device. Under such condition, the processor 802 may acquire an electric signal transmitted by the cable, and based on the electric signal, the device information of the target device may be acquired.

Optionally, a plurality of cables may be configured to connect the server system to a plurality of target devices, and each cable may be configured for transmitting an electric signal. Further, the electric signals transmitted by different cables may be the same or different, and based on such electric signals, the device information of the plurality of target device may be acquired by the server system.

Figure 11:
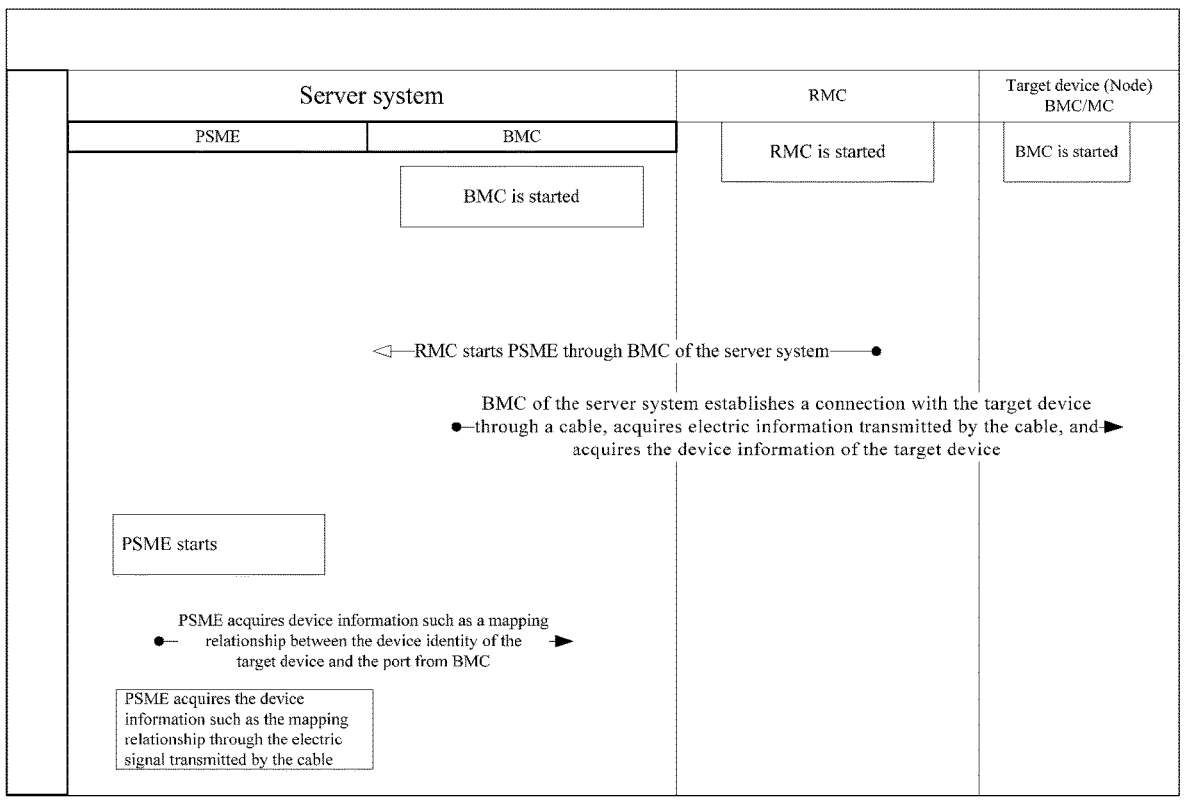
FIG. 11 illustrates a structural schematic view of another application example of a server system in accordance with some embodiments of the present disclosure.

FIG. 11 illustrates another example of an interaction diagram of a server system. As shown in FIG. 11, the server system may include a PSME and a BMC. The server system, or more specifically, the BMC of the server system, may be connected to the RMC, and the RMC may be connected to a BMC or a MC of each of a plurality of target devices.

Referring to FIG. 11, the BMC of the server system, the RMC, and the BMC (or MC) of each target device may be started, and the PSME of the server system may be started, for example, by the BMC of the server system. Further, the BMC of the server system may establish a connection with the BMC of each target device via a cable, such as a proprietary cable. Thus, the BMC of the server system may acquire an electric signal transmitted by each proprietary cable, and based on such signals, acquire the device information of the target devices, such as a mapping relationship between device identity of each target device and a corresponding port that each target device is connected to.

Further, the PSME of the server system may acquire the device information of the target devices from the BMC of the server system. For example, the PSME may acquire the mapping relationship between device identity of each target device and a corresponding port that each target device is connected to. That is, the PSME may acquire the device information of each target device, such as the mapping relationship, through the electric signal transmitted by each cable.

In one embodiment, the connector 801 may be a driving interface, and the driving interface may realize the driving channel connection between the server system and one or more target devices. Under such condition, the processor 802 may be specifically configured for utilizing the driving channel to receive the device information uploaded by each target device.

Figure 12:
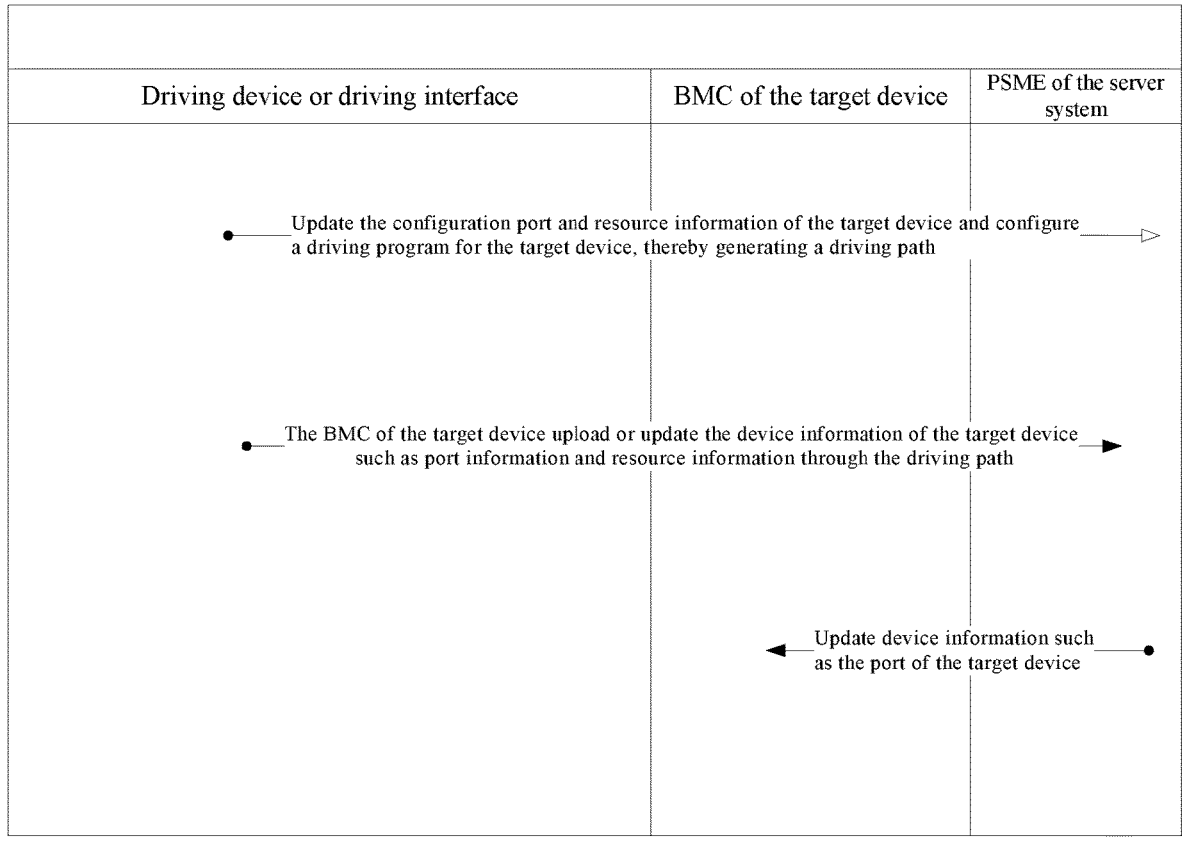
FIG. 12 illustrates a structural schematic view of another application example of a server system in accordance with some embodiments of the present disclosure.

FIG. 12 illustrates another example of an interaction diagram of a server system. As shown in FIG. 12, the server system may include a PSME and a BMC. The server system may be connected to a BMC or MC of a target device. Optionally, the server system may be connected to a plurality of target devices via the BMC or MC of each target device.

Referring to FIG. 12, after the BMC of the server system, the BMC of the target device, and the PSME of the server system are started, the driving interface or a driving device may update the configuration port and the resource information of the target device, and configure a driving program for the target device. The driving program may be executed to generate a driving channel.

Further, the BMC of the target device may upload or update the device information of the target device, such as the port information and the resource information of the target device, via the driving channel. Thus, the PSME may utilize the driving channel to receive the device information uploaded by the target device, such as the mapping information between the device identity of the target device and the port to which the target device is connected. Further, the device information of the target device, such as the port of the target device, may be updated.

Various embodiments of the present specification are described in a progressive manner, in which each embodiment focuses on aspects different from other embodiments, and the same and similar parts of each embodiment may be referred to each other. Because the disclosed systems correspond to the disclosed methods, the description of the disclosed systems and the description of the disclosed methods may be read in combination or in separation.

It should be noted that, in the present disclosure, relational terms such as first, second (or then) are merely for differentiating one object or operation from another object or operation without necessarily requiring or indicating any actual relationship or sequence between such objects or operations. Further, terms of "comprising" and "including" or any other variations thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The foregoing is detailed descriptions of a method for identifying devices in a server system and a server system thereof provided by present disclosure. The aforementioned illustrations of the disclosed embodiments teach those skilled in the relevant art to implement or employ the present disclosure. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for identifying a device connected to a server system, comprising:
    establishing a connection between the server system and a plurality of target devices; and
    acquiring device information of each of the plurality of target devices based on the connection, wherein; the connection is at least one of a data connection or a device connection;
        the device connection provides at least one router manager center (RMC) device configured to connect the server system with the plurality of target devices; and
    acquiring the device information of each of the plurality of target devices further comprises:
        acquiring correspondence relationship information transmitted by the at least one RMC, wherein the correspondence relationship information is obtained by the at least one RMC by sequentially powering up ports of the plurality of target devices connected to the server system, and the correspondence relationship information comprises correspondence relationship information among the ports, device identifiers of the plurality of target devices, and IP addresses of the plurality of target devices, and
        based on the correspondence relationship information, acquiring the device information of the plurality of target devices.

2. The method according to claim 1, wherein: the device connection between the server system and the plurality of target devices provides at least one memory for the connection, wherein the at least one memory is connected between the server system and the plurality of target devices for pre-storing device information of the plurality of target devices; and acquiring the device information of the plurality of target devices includes: reading pre-stored device information of the plurality of target devices from the at least one memory.

3. The method according to claim 1, wherein: the device connection between the server system and the plurality of target devices provides at least one cable for the connection, wherein the at least one cable is connected between the server system and the plurality of target devices for transmitting at least one electric signal; and acquiring the device information of the plurality of target devices includes: acquiring the at least one electric signal transmitted by the at least one cable, and based on the at least one electric signal, acquiring the device information of the plurality of target devices.

4. The method according to claim 1, wherein: the data connection between the server system and the plurality of target devices provides at least one driving channel for the connection, wherein the at least one driving channel is established between the server system and the plurality of target devices; and acquiring the device information of the plurality of target devices includes: utilizing the at least one driving channel to receive the device information uploaded by the plurality of target devices.

5. A server system, comprising:
    a processor connected to a connector, wherein:
        the connector establishes a connection between the server system and a plurality of target devices, the processor acquires device information of the plurality of target devices through the connection established by the connector, the connection established by the connector includes at least one of a data connection or a device connection, the connector includes a router manager center (RMC), wherein the RMC is connected between the server system and the plurality of target devices, the processor acquires correspondence relationship information transmitted by the RMC, the correspondence relationship information is obtained by the RMC by sequentially powering up ports of the plurality of target devices connected to the server system, the correspondence relationship information comprises correspondence relationship information among the ports, device identifiers of the plurality of target devices, and IP addresses of the plurality of target devices, and based on the correspondence relationship information, the device information of the plurality of target devices is acquired.

6. The server system according to claim 5, wherein: the connector is a memory, connected between the server system and the plurality of target devices; and the processor reads pre-stored device information of the plurality of target devices from the memory.

7. The server system according to claim 5; wherein: the connector is a cable, connected between the server system and the plurality of target devices; and the processor acquires an electric signal transmitted by the cable, and based on the electric signal, acquiring the device information of the plurality of target devices.

8. The server system according to claim 5, wherein:

the connector includes a driving interface, wherein the driving interface establishes a driving channel between the server system and the plurality of target devices; and the processor utilizes the driving channel to receive the device information uploaded by the plurality of target devices.

* * * * *